United States Patent
Nakayama

(10) Patent No.: US 7,460,729 B2
(45) Date of Patent: Dec. 2, 2008

(54) DATA TRANSFORM PROCESSING APPARATUS AND METHOD

(75) Inventor: Tadayoshi Nakayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 583 days.

(21) Appl. No.: 10/870,974

(22) Filed: Jun. 21, 2004

(65) Prior Publication Data

US 2004/0258320 A1    Dec. 23, 2004

(30) Foreign Application Priority Data

Jun. 23, 2003  (JP) ............................. 2003-178610
Jun. 11, 2004  (JP) ............................. 2004-174595

(51) Int. Cl.
*G06K 9/36* (2006.01)
*G06K 9/46* (2006.01)

(52) U.S. Cl. ...................................... 382/276; 382/250

(58) Field of Classification Search ................ 382/250; 375/240.03; 714/38
See application file for complete search history.

(56) References Cited

U.S. PATENT DOCUMENTS

| | | | |
|---|---|---|---|
| 5,581,373 A | 12/1996 | Yoshida | 358/476 |
| 5,801,650 A | 9/1998 | Nakayama | 341/67 |
| 5,818,970 A | 10/1998 | Ishikawa et al. | 382/248 |
| 5,841,381 A | 11/1998 | Nakayama | 341/67 |
| 5,986,594 A | 11/1999 | Nakayama et al. | 341/107 |
| 6,301,602 B1 * | 10/2001 | Ueki | 718/103 |
| 6,408,102 B1 | 6/2002 | Nakayama | 382/246 |
| 6,549,676 B1 | 4/2003 | Nakayama et al. | 382/246 |
| 6,553,143 B2 | 4/2003 | Miyake et al. | 382/239 |
| 6,560,365 B1 | 5/2003 | Nakayama et al. | 382/233 |
| 6,567,562 B1 | 5/2003 | Nakayama et al. | 382/246 |
| 6,711,295 B2 | 3/2004 | Nakayama et al. | 382/232 |
| 6,865,299 B1 | 3/2005 | Nakayama | 382/246 |
| 6,898,310 B1 | 5/2005 | Ohmi et al. | 382/166 |
| 6,996,593 B2 | 2/2006 | Nakayama | 708/316 |
| 7,188,132 B2 * | 3/2007 | Nakayama | 708/400 |
| 7,295,609 B2 * | 11/2007 | Sato et al. | 375/240.03 |

(Continued)

OTHER PUBLICATIONS

Fukuma et al., "*Lossless 8-Point High-Speed DiscreteCosine Transform Utilizing Lossless Hadamard Transform*", Shingaku Gihou, IE99-65, pp. 37-44, Oct. 1999. English Abstract only.

(Continued)

*Primary Examiner*—Brian Q Le
*Assistant Examiner*—Amara Abdi
(74) *Attorney, Agent, or Firm*—Fitzpatrick, Cella, Harper & Scinto

(57) ABSTRACT

A data transform processing apparatus comprising a first lossless transform circuit to perform two step ladder operation processings of receiving unweighted normalized data then outputting weighted nonnormalized rotation-transformed data, and a second lossless transform circuit to perform two step ladder operation processings of receiving the weighted nonnormalized rotation-transformed data from the first lossless transform circuit then performing inverse weighting and outputting unweighted normalized rotation-transformed data, wherein the outputs from the first lossless transform circuit are interchanged and supplied to the second lossless transform circuit.

4 Claims, 18 Drawing Sheets

U.S. PATENT DOCUMENTS

| | | |
|---|---|---|
| 2003/0002743 A1 | 1/2003 | Ohta et al. .................. 382/239 |
| 2003/0043905 A1 | 3/2003 | Nakayama et al. ..... 375/240.04 |
| 2003/0043907 A1 | 3/2003 | Nakayama ............. 375/240.08 |
| 2003/0086127 A1 | 5/2003 | Ito et al. ..................... 358/462 |
| 2003/0086597 A1 | 5/2003 | Ohta et al. .................. 382/131 |
| 2003/0088598 A1 | 5/2003 | Nakayama .................. 708/300 |
| 2003/0194138 A1 | 10/2003 | Osawa et al. ................ 382/233 |
| 2003/0228063 A1 | 12/2003 | Nakayama et al. .......... 382/251 |

OTHER PUBLICATIONS

Komatsu et al., "*Reversible Discrete Cosine Transform and Its Application to Image Information Compression*", Shingaku Gihou, IE97-83, pp. 1-6, Nov. 1997. English Abstract Only.

* cited by examiner

F I G. 5A
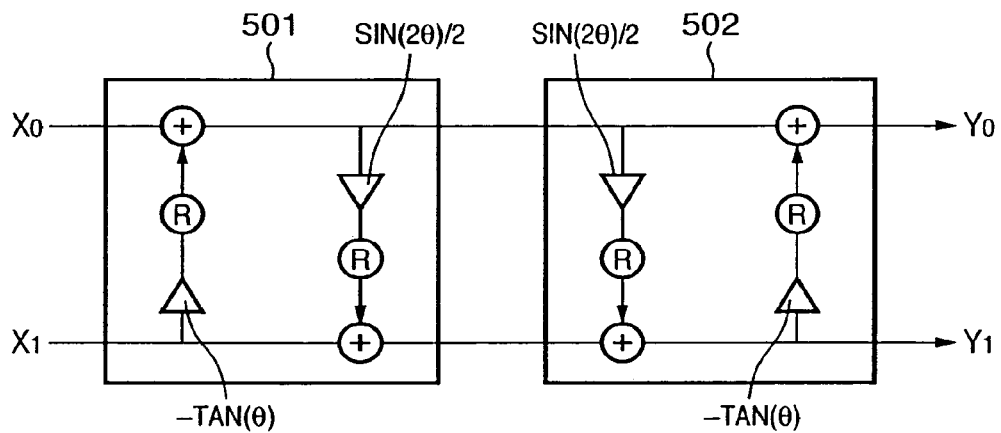
F I G. 5B
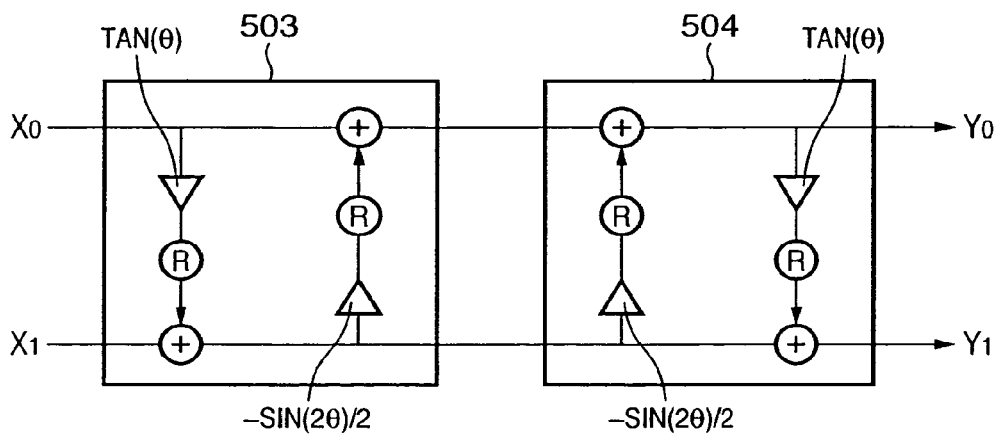

F I G. 13
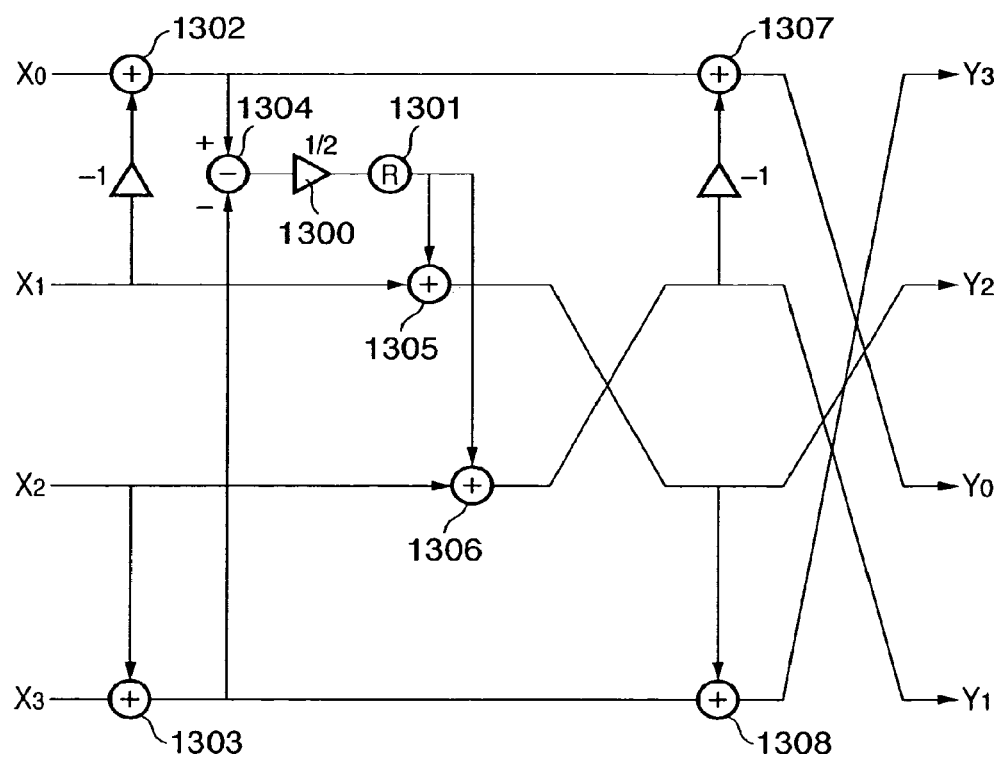

DATA TRANSFORM PROCESSING APPARATUS AND METHOD

FIELD OF THE INVENTION

The present invention relates to a data transform processing apparatus and its method for performing a lossless 4-point orthogonal transform processing capable of, for example reversible transform to output integer data.

BACKGROUND OF THE INVENTION

Images and particularly multivalue images include a very large amount of information. Upon storage or transmission of such image, the large data amount causes a problem. For this reason, upon storage or transmission of image, employed is high efficiency coding to reduce the amount of image data by eliminating redundancy of image or allowing the degradation of image to a degree that degradation of image quality is not visually recognizable. For example, in the JPEG method recommended by the ISO and the ITU-T as an international standardized still picture coding method, image data is compressed by performing discrete cosine transform (DCT) by block (8 pixels×8 pixels) to obtain DCT coefficients, then quantizing the respective DCT coefficients, and entropy encoding the quantized results. Other compression techniques such as H261 and MPEG 1/2/4 methods also utilize the DCT transform.

In the JPEG method, a lossless coding mode was standardized such that a compressed/decompressed image completely corresponds with its original image, however, at that time, a lossless transform technique was not fully studied and lossless transform using DCT was not realized. Accordingly, the lossless coding was realized by predictive coding in several pixel units using a technique different from a DCT-used block transform coding.

Thereafter, a standard coding technique specialized for lossless coding (JPEG-LS) was standardized, and in the further-standardized JPEG 2000, both lossless transform and general compression with degradation (lossy transform) are realized.

In recent years, a DCT lossless transform has been studied to try to realize JPEG lossless compression based on the currently popularized DCT transform. The DCT used in the JPEG compression is an 8 point DCT transform. As shown in FIG. 1, the 8 point DCT is divided into four 2-point transforms, a 4-point DCT and a 4-point orthogonal transform. The 4-point DCT and the 4-point transform are further divided into 2-point transforms, but here the 4-point DCT will be described.

As shown in FIG. 2, the 4-point DCT is divided into four 2-point transforms 201 to 204. A lossless transform can be realized by changing the respective 2-point transforms to lossless transforms. The change of the 2-point transform to lossless transforms can be realized by a ladder network and rounding, as introduced by Kuninori Komatsu and Kaoru Sezaki, "Reversible Discrete Cosine Transform and Its Application to Image Information Compression" (Shingaku Gihou, IE97-83, pp. 1 to 6, November 1997) (Document 1).

In this method, input/output data are interchanged so as to obtain "1" as determinant values of 2-point transform matrix, then the 2-point transform becomes a rotational transform. It is well known in the field of geometry that a 2-point transform can be realized with three two-dimensional shear transforms. In a 2×2 transform matrix in the two-dimensional shear transform, two diagonal components are "1", and one of two off-diagonal components is "0", and the other one is a parameter corresponding to an angle of inclination.

In a signal flow of the shear transform, one shear transform is replaced with a single-step ladder operation including multiplication processing and addition processing. Accordingly, the 2-point rotational transform is realized with three-step ladder operation as shown in FIG. 3. In FIG. 3, the 2-point rotational transform can be easily changed to a lossless transform by rounding values after multiplication processing in each step of ladder operation. That is, the ladder operation in lossless transform includes multiplier 311, 321 and 331, rounding units 313, 323 and 333, and adder 315, 325 and 335 (in some cases, these adder may be subtractor). In a case where a rotational angle is θ, multiplication coefficients in the multiplication processors 311, 321 and 331 are TAN(θ/2), −SIN(θ) and TAN(θ/2).

Then, rounding processing is performed so as to round the results of multiplication by one step of ladder operation, thereby rounding errors occur unless the results of multiplication are integers, and the rounding errors are included in output data.

Conventionally, the 4-point orthogonal lossless transform including four 2-point rotational transforms is arranged as shown in FIG. 4.

In FIG. 4, numerals 401 to 404 denote 2-point rotational transforms each is three-step ladder operation as shown in FIG. 3. The entire lossless 4-point orthogonal transform has 12 steps of ladder operation and 12 rounding processings (R). The number of rounding errors increases in proportion to the number of rounding processings.

On the other hand, in the above document 1, the lossless transform is realized by dividing a 4-point orthogonal transform into five four-dimensional shear transforms. As a single n-dimensional shear transform corresponds (n−1) ladder operations, in the 4-point orthogonal transform, (4−1)×5=15 ladder operations are required. The number equals the number of multiplication processings. However, by virtue of shear transform, the number of rounding processings can be greatly reduced. In a multidimensional shear transform, as the ends of ladder operations (data as the subjects of addition) are concentrated to one data, these data are added up then rounding processing is performed. Thus the number of rounding processings can become one. In the 4-point orthogonal transform in the above document 1, five rounding processings are performed totally.

In use of results of non-lossless transform, for example results of linear transform, in the above lossless transformed data, the rounding errors increase in proportion to the number of rounding processings and the accuracy of transform is degraded.

Upon decoding of coded data generated by entropy coding after lossless transform, there is no problem if an inverse lossless transform corresponding to the lossless transform is necessarily performed. However, in a case where data JPEG-encoded by using a lossless DCT transform is decoded with a general JPEG decoder, the difference of lossless DCT accuracy appears as a difference of decoded image signal, which influences the image quality. This means that the lossless transform should desirably be close to linear transform as much as possible.

Further, in a case where the same type of transform is used in lossless coding and lossy coding, a lossless transform is required. In consideration of coding efficiency upon lossy coding, the lossless transform should desirably be close to a linear transform as much as possible.

In the conventional lossless 4-point orthogonal transform processing, the number of multiplication processings is 12 or 15. If the number of multiplications is smaller, the number of rounding processings is 12, while if the number of rounding processings is 5, the number of multiplications is 15. To increase the transform accuracy so as to reduce the errors in linear 4-point orthogonal transform, it is necessary to select a method with a smaller number of rounding processings. However, as the number of operations increases, the processing speed is lowered, or the hardware scale increases.

Further, if a high priority is placed on the processing speed and hardware scale, the number of rounding processings is 12, and the transform accuracy is seriously low. In this manner, it has been difficult to improve both the transform accuracy and the processing speed (hardware scale).

SUMMARY OF THE INVENTION

The present invention has been made in consideration of the above conventional art, and provides a data transform processing apparatus and its method capable of performing lossless orthogonal transform processing with a small amount of operation or with a small circuit scale.

Further, the present invention provides a data transform processing apparatus and its method for performing lossless orthogonal transform processing with high transform accuracy.

The data transform apparatus according to one aspect of the present invention is a data transform processing apparatus comprising: two first transform means for performing two step ladder operation processings respectively of receiving unweighted normalized data and outputting weighted non-normalized rotational-transformed data; and two second transform means for performing two step ladder operation processings respectively of receiving the weighted nonnormalized rotational-transformed data from the two first transform means, performing inverse weighting and outputting unweighted normalized lossless rotational-transformed data, wherein the respective two data outputted from the two first transform means are inputted into the two second transform means respectively, and a lossless 4-point orthogonal transform is performed.

Further, the data transform method according to one aspect of the present invention is a data transform processing method comprising: first and second transform steps of performing two step ladder operation processings respectively of receiving unweighted normalized data and outputting weighted nonnormalized rotational-transformed data; and third and fourth transform steps of performing two step ladder operation processings respectively of receiving the weighted nonnormalized rotational-transformed data from the first and second transform steps, performing inverse weighting and outputting unweighted normalized lossless rotational-transformed data, wherein the respective two data outputted in the first and second transform steps are inputted in the third and fourth transform step respectively, and a lossless 4-point orthogonal transform is performed.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 5A and 5B are block diagrams showing a lossless 4-point orthogonal transform according to a first embodiment of the present invention;

FIG. 13 is a block diagram showing the lossless 4-point orthogonal transform (lossless Hadamard transform) according to a fifth modification to the second embodiment;

DETAILED DESCRIPTION OF THE PREFERRED EMBODIMENTS

Preferred embodiments of the present invention will now be described in detail in accordance with the accompanying drawings.

First Embodiment

Figure 3:
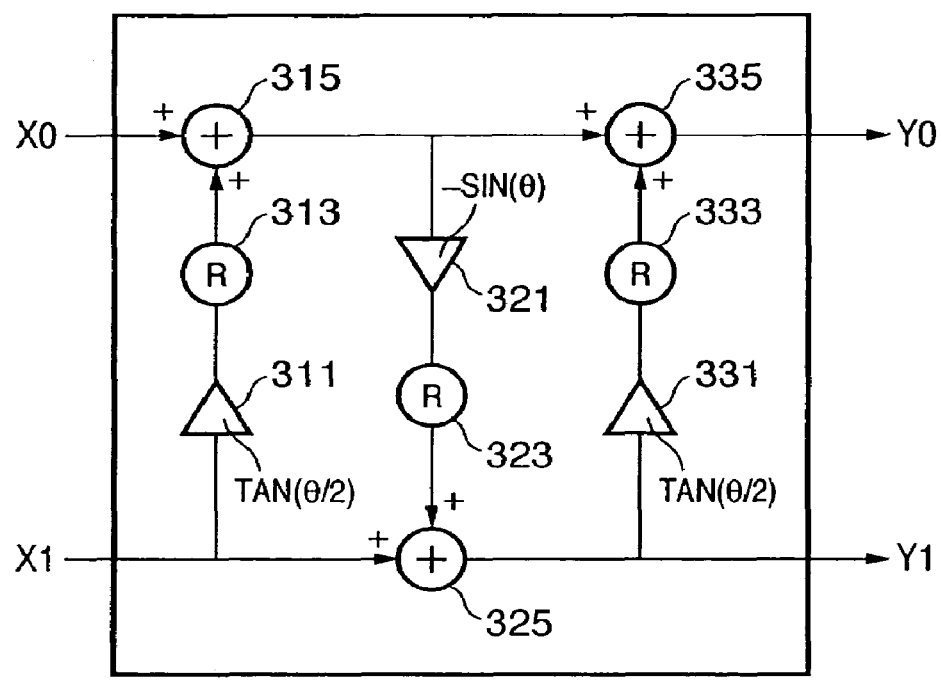
FIG. 3 is a block diagram showing the structure of a conventional lossless 2-point orthogonal rotational transform processor.

As described above, the above document 1 shows a structure to realize a lossless 2-point transform as shown in FIG. 3. FIG. 3 has been briefly described above, however, in consideration of development of the art to the present embodiment, the structure will be described again in a case where the rotational angle is (−2θ).

In a case where the rotational angle is (−2θ), in the multiplication processor 311 in the first step ladder operation portion, one data (X1) is multiplied by (−TAN(θ)), then rounding processing is performed by the rounding processor 313 to obtain an integer value from data below decimal point, and the result of the rounding is added to the other data (X0) by the addition processor 315.

Further, similar processing is performed in the second step and third step ladder operation portions on the assumption that a multiplication coefficient in the second step ladder operation portion is SIN(2θ) and that in the third step ladder operation portion is (−TAN (θ)). Note that other documents and the like merely show such three-step ladder operation as examples of 2-point lossless transform.

FIG. 5A shows a structure where the multiplication coefficient in the multiplication processor 321 (FIG. 3) in the second step ladder operation portion is reduced to half (SIN (2θ)/2) and the second step ladder operation is divided into two steps. If the rounding processing is ignored, the processing in FIG. 5A is interpreted as follows.

Assuming that the rotational angle of the transform processing is (−2θ), rotation by (−θ) is performed by the preceding two steps of ladder operation 501, rotation by (−θ) is performed by the subsequent two steps of ladder operation 502, thus rotation by (−2θ) as a whole is performed. In this case, the rotational angle in the preceding two steps of ladder operation 501 and that in the subsequent two steps of ladder operation 502 are the same, however, transformed data is not normalized in the rotational transform by the preceding two steps of ladder operation 501, and the two transformed data are weighted with a scaling coefficient (COS(θ)) depending on the rotational angle (−θ). The scaling coefficient is 1/COS (θ) in the upper output from the ladder operation 501, and is COS(θ) in the lower output. In the subsequent two steps of ladder operation 502, the weighted nonnormalized data are subjected to rotation processing and inverse weighting, and finally normalized rotation-transformed data are generated.

Figure 4:
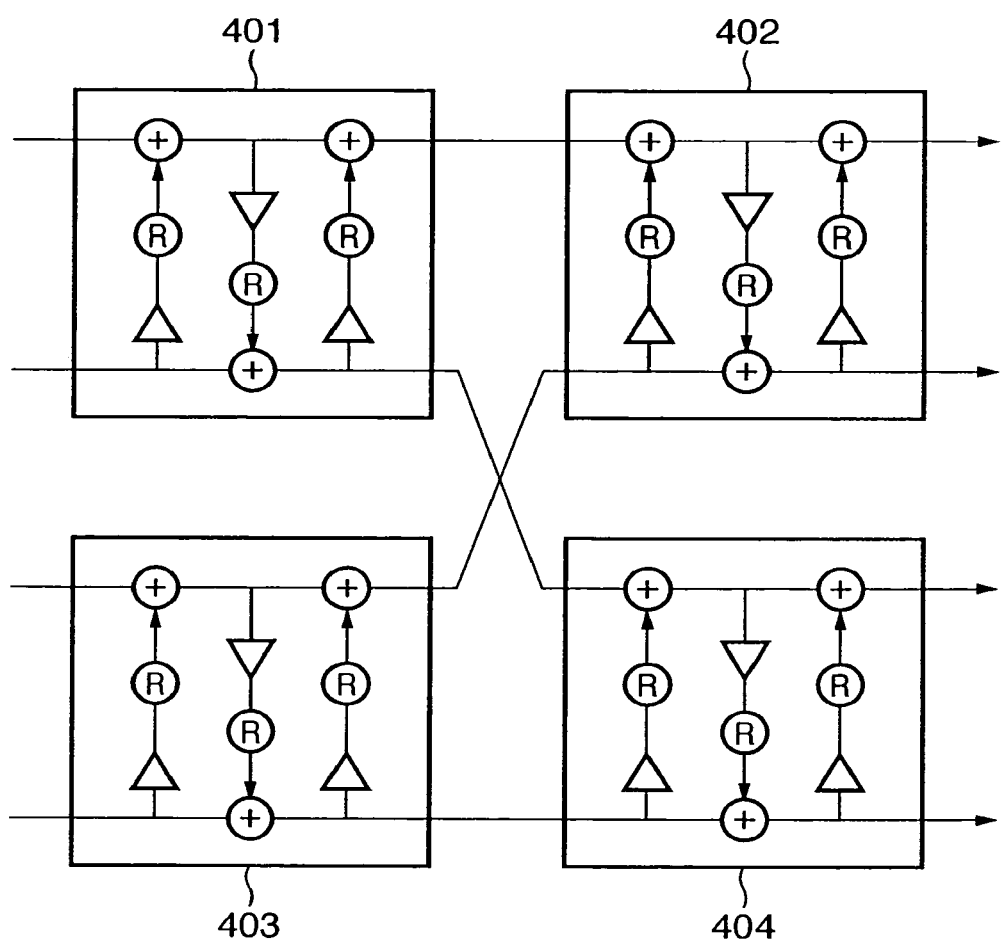
FIG. 4 is a block diagram showing the structure of a conventional lossless 4-point orthogonal transform processor.

Conventionally, nothing has been obtained in the analysis of the content of rotation processing in FIG. 4. Further, as the multiplication and rounding processings increase, such structure with wastefulness has been worthless. However, the present inventor has found a new analysis and a new lossless 4-point transform structure based on the new analysis. The structure has elements in FIG. 5A as basic constituent elements. Further, a third embodiment to be described later is based on the structure in FIG. 5A. Accordingly, the structure in FIG. 5A itself showing an inventive concept will be described as the first embodiment of the present invention.

Modifications to First Embodiment

FIGS. 5A and 5B and FIGS. 6A and 6B are block diagrams showing the lossless 4-point orthogonal transform according to the first embodiment of the present invention.

Figure 6A:
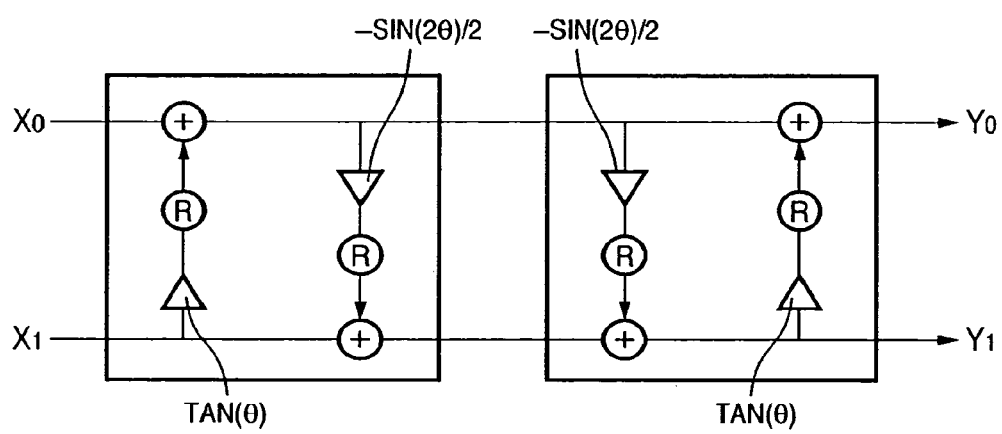
FIGS. 6A and 6B are block diagrams showing the lossless 4-point orthogonal transform according to the first embodiment.
Figure 6B:
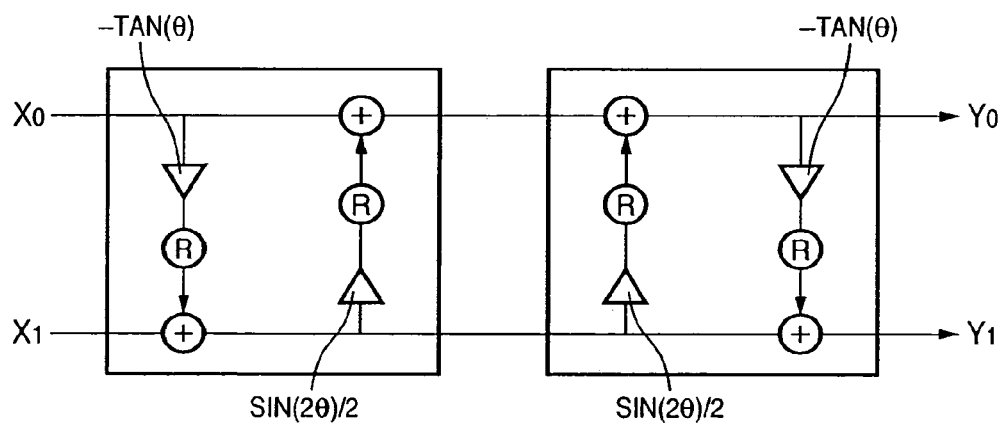

Modifications as shown in FIG. 5B and FIGS. 6A and 6B can be considered from the structure in FIG. 5A.

In FIG. 5B, the signs of the multiplication coefficients in the ladder operations in FIG. 5A are inversed, and all the directions of the ladder operations are inversed from those in FIG. 5A. Accordingly, the structure in FIG. 5B has the same function as that in FIG. 5A.

In FIG. 6A, the directions of the ladder operations are the same as those in FIG. 5A, however, the signs of the multiplication coefficients in the ladder operations are inversed from those in FIG. 5A.

In FIG. 6B, the multiplication coefficients are the same as those in the ladder operations in FIG. 5A, however, all the directions of the ladder operations are inversed from those in FIG. 5A. In other words, the signs of the multiplication coefficients in FIG. 5B are inversed. The structure in FIG. 6B has the same function as that in FIG. 6A.

Next, a supplementary explanation will be made about the above modifications.

There are two methods to inverse the rotational direction of rotation processing. One method is to inverse the signs of multiplication coefficients in ladder operations, and the other method is to inverse the directions of the ladder operations. In FIG. 6A, the former is applied to FIG. 5A; in FIG. 6B, the latter is applied to FIG. 5A; and in FIG. 5B, the both are applied to FIG. 5A. In FIG. 5B, as the rotational direction becomes the same as the initial direction by inversing the rotational direction twice, the rotational direction in FIG. 5B is the same as that in FIG. 5A.

FIGS. 5A and 5B have the same function, however, weightings of internal data in FIG. 5B are different from that in FIG. 5A. As described above, in FIG. 5A, the output data from the lossless transform 501 is weighted with the scaling coefficients 1/COS(θ) and COS(θ). On the other hand, in FIG. 5B, the output data from a lossless transform 503 are weighted with COS(θ) and 1/COS(θ) inversed from the scaling coefficients in FIG. 5A. Then a lossless transform 504 performs rotation and normalization corresponding to the weighted data. This is the difference between FIGS. 5A and 5B.

Similarly, FIGS. 6A and 6B have the same function, however, weighting of internal data in FIG. 6B is inversed from that in FIG. 6A.

Although FIGS. 5A and 5B and FIGS. 6A and 6B are not shown in the form of flowchart, a lossless orthogonal transform can be easily realized by software by merely performing operations sequentially from the left ladder operation, and the structures can be easily realized as hardware.

Generally, in respective reports and the like, processings such as DCT and orthogonal transform are not expressed in the form of flowchart but in the form of signal flow as in the case of FIGS. 1 to 6. Since this form can be conveniently used in correspondence with realization of processing as both software and hardware, all the following figures are in the form of signal flow.

Second Embodiment

Figure 7:
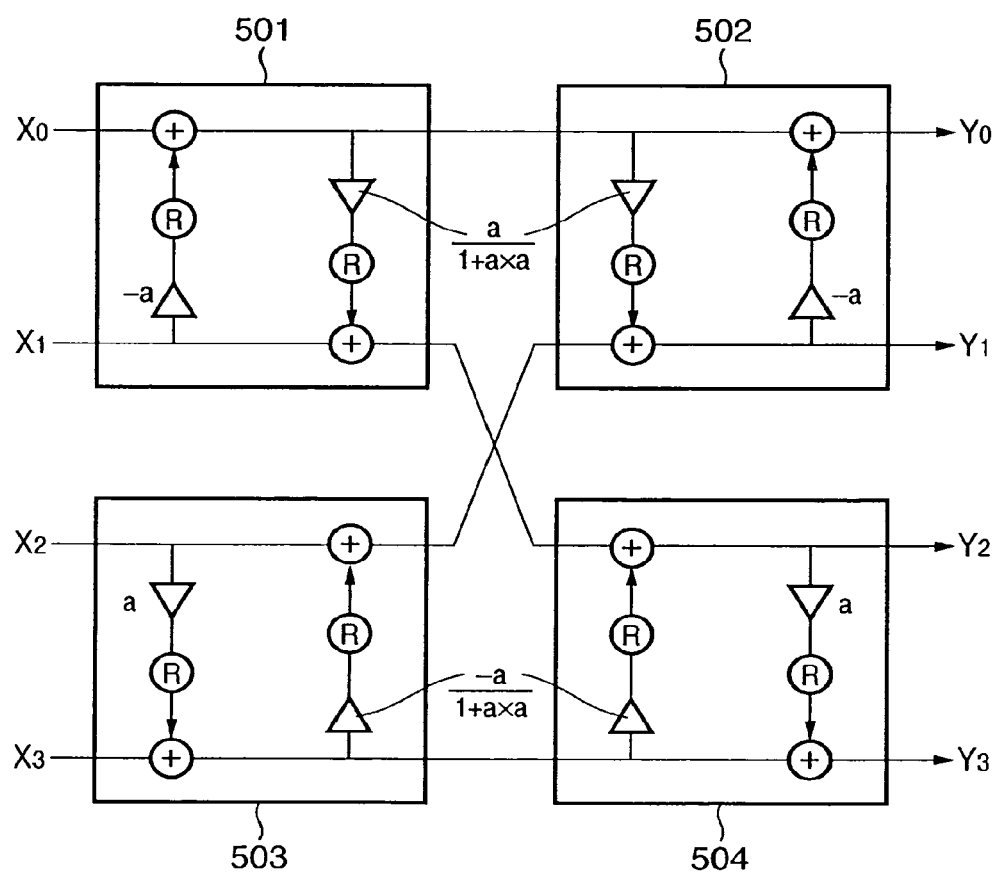
FIG. 7 is a block diagram showing the lossless 4-point orthogonal transform according to a second embodiment of the present invention.

Next, 4-point orthogonal transform method and apparatus using a combination of the basic structures in the above-described first embodiment will be described as a second embodiment of the present invention. The basic form of the second embodiment is as shown in FIG. 7. In FIG. 7, as a coefficient, a=TAN(θ) holds.

FIG. 7 is a block diagram showing the lossless 4-point orthogonal transform according to the second embodiment of the present invention.

In FIG. 7, a normal (normalized data input and normalized data output) lossless 4-point orthogonal transform is performed by using the structures in FIGS. 5A and 5B described in the first embodiment. The rotational angle in the respective basic structures is 2θ.

The four input data (X0 to X3) are lossless transformed by lossless transforms 501 and 503 and weighted intermediate data are generated. The intermediate data are weighted with 1/COS(θ), COS(θ), COS(θ) and 1/COS(θ). Then the second and third data with the same weight are interchanged and inputted into the next lossless transforms 502 and 504, thereby the weights are removed, and at the same time, lossless rotational transforms are realized.

Note that the results of transform processing in a case where rounding processings are ignored, for example, linear transforms are performed, are as follows.

$$Y0=(X0-aX1-aX2+a^2X3)/(1+a^2)$$

$$Y1=(aX0-a^2X1+X2-aX3)/(1+a^2)$$

$$Y2=(aX0+X1-a^2X2-aX3)/(1+a^2)$$

$$Y3=(a^2X0+aX1+aX2+X3)/(1+a^2)$$ [Expression 1]

Assuming that the multiplication coefficients for the input data are vectors, all the four vectors corresponding to the four transform expressions are orthogonal to each other (the inner product is "0"). Further, as the absolute vector value is "1", a 4-point normal orthogonal transform is realized.

In the conventional 4-point normal orthogonal transform using four rotation processings, even if the four rotation processings have the same rotational angle, the respective rotation processings are replaced with three-step ladder operations, so that the transform is realized by total 12 ladder operations. However, in the present embodiment, the transform can be realized by eight step ladder operations.

In the conventional lossless transform, as rounding processing is performed in each ladder operation, 12 rounding processings are necessary. On the other hand, according to the second embodiment, only 8 rounding processings are performed as shown in FIG. 7, thus the transform errors regarding the linear transforms can be reduced.

First Modification to Second Embodiment

The two lossless 2-point transforms may be those in FIGS. 5A and 6A. As the rotational directions in FIG. 6A are inverse of those in FIG. 5A, the two data inputted to the FIG. 6A side are interchanged as shown in FIG. 8.

Figure 8:
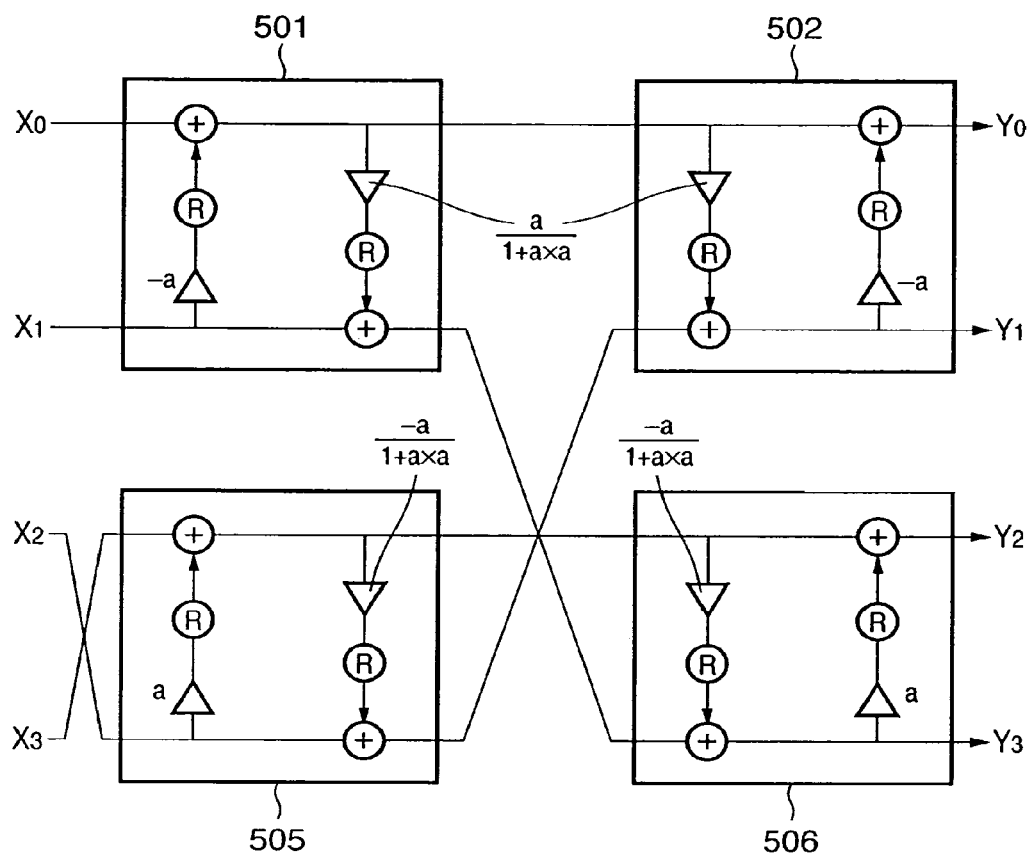
FIG. 8 is a block diagram showing the lossless 4-point orthogonal transform according to a first modification to the second embodiment.

FIG. 8 is a block diagram showing the lossless 4-point orthogonal transform according to a first modification to the second embodiment of the present invention.

The modification means that the lossless 4-point orthogonal transform can be realized with two lossless 2-point transforms having inverse rotational directions.

The transform expressions of the 4-point orthogonal transform obtained by the structure in FIG. 8 are as follows. Note that the rounding processings are ignored and the transforms are expressed as liner transforms. It is understood from a comparison with the transform expressions in FIG. 7 that the third and the fourth expressions are interchanged in correspondence with the interchanged input data and the inverse directions of the rotation processings.

$$Y0=(X0-aX1-aX2+a^2X3)/(1+a^2)$$

$$Y1=(aX0-a^2X1+X2-aX3)/(1+a^2)$$

$$Y2=(a^2X0+aX1+aX2+X3)/(1+a^2)$$

$$Y3=(aX0+X1-a^2X2-aX3)/(1+a^2)$$ [Expression 2]

Second Modification to Second Embodiment

Figure 9:
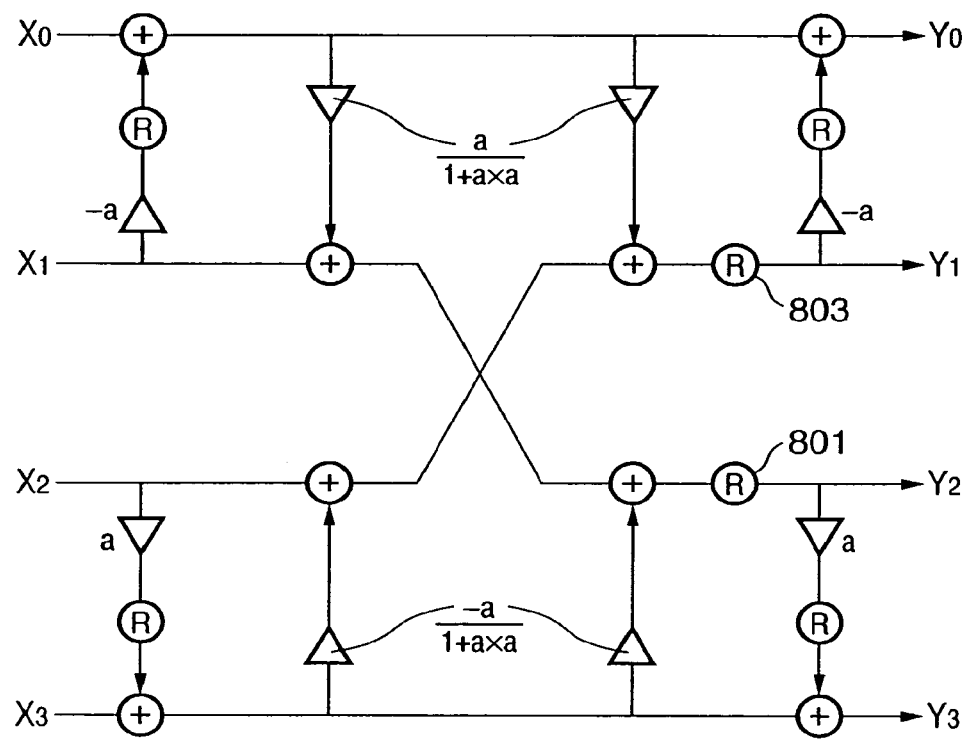
FIG. 9 is a block diagram showing the lossless 4-point orthogonal transform according to a second modification to the second embodiment.

Further, in a case where the structure in FIG. 7 is modified as a structure in FIG. 9, the number of rounding processings can be reduced and the transform errors can be further reduced.

FIG. 9 is a block diagram showing the lossless 4-point orthogonal transform according to second modification to the second embodiment.

In FIG. 9, the rounding processing in the second step ladder operation in the lossless transform 501 and the rounding processing in the first step ladder operation in the lossless transform 504 in FIG. 7 are integrated. That is, losslessness can be maintained even in a case where the results of multiplications are added then rounding processing is performed once and the result is added to data as the subject of addition.

Further, the rounding processing in the second step ladder operation in the transform 503 and the rounding processing in the first step ladder operation in the transform 502 in FIG. 7 can be integrated.

Next, the integrated rounding processing is shifted to a position after the third addition processing in the ladder operation. FIG. 9 shows such shifted rounding processors denoted by numerals 801 and 803. The rounding processing can be shifted since, assuming that round( ) is a rounding function, R, a real number, and N, an integer, the following relation can be established.

$$\text{round}(R)+N=\text{round}(R+N)$$ [Expression 3]

Note that the left side corresponds to the rounding before the shift, and the right side, to the rounding after the shift. The expression 3 indicates that the result of rounding processing performed after addition of a real number to an integer is the same as that of rounding processing performed before addition of rounded result to the integer. The real number corresponds to the sum of the results of multiplications in the second step and third step ladder operation respectively, before the new rounding processors 801 and 803. Note that the rounding processing of the embodiment may be a most general rounding off (to the nearest whole number), or may be rounding up or rounding down.

Third Modification to Second Embodiment

Figure 10:
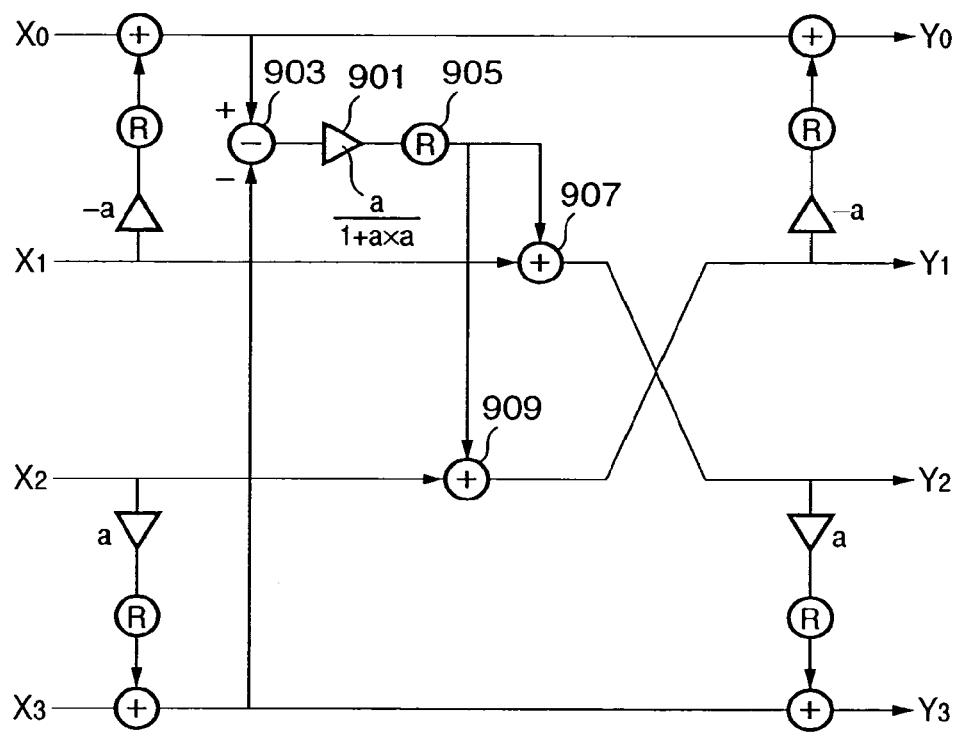
FIG. 10 is a block diagram showing the lossless 4-point orthogonal transform according to a third modification to the second embodiment.

The structure in FIG. 7 may be modified as shown in FIG. 10.

FIG. 10 is a block diagram showing the lossless 4-point orthogonal transform according to a third modification to the second embodiment.

In FIG. 10, the multiplication with the multiplication coefficient $\{a/(1+a^2)\}$ in FIG. 7 is commonalized. This modification can be easily understood by those skilled in the art. Numeral 901 denotes a commonalized multiplication processor, numeral 903 denotes a subtraction processor to integrate data for commonality of multiplication, numeral 905 denotes a rounding processor to obtain an integer from the result of multiplication by the multiplication processor 901, and numerals 907 and 909 denote addition processor to add integer data to other data. The other processors are the same as those described above.

The feature of the structure in FIG. 10 is that the operation scale of the lossless 4-point orthogonal transform is smaller than that of two lossless 2-point orthogonal transforms (although one subtraction processing is added, one multiplication as a more complicated operation is eliminated. This is a great difference in hardware).

In the case of the modification in FIG. 10, it cannot be say that all the processing is made only with ladder operations. However, it can be interpreted that the structure in FIG. 10 is also made with all the ladder operations by expanding the ladder operations as follows.

A normal ladder operation is a 1-input 1-output operation, however, in this modification, the structure in FIG. 10 including processors 901, 903, 905, 907 and 909 is considered as a 2-input 2-output ladder operation. Further, an n-input m-output ladder operation can be made. In this case, the number of multiplication processor is limited to one. Further, the expanded ladder operation needs an addition/subtraction processor for integration of plural input data to the one multiplication processor.

By introducing this expanded ladder operation, it can be said that the structure in FIG. 10 has four 1-input 1-output ladder operations and one 2-input 2-output ladder operation.

In a case where the rounding processings are removed from the structure in FIG. 10, a liner 4-point orthogonal transform (lossy transform) can be realized with a small amount of operation. That is, the five rounding processors are removed from FIG. 10 as shown in FIG. 11.

Figure 11:
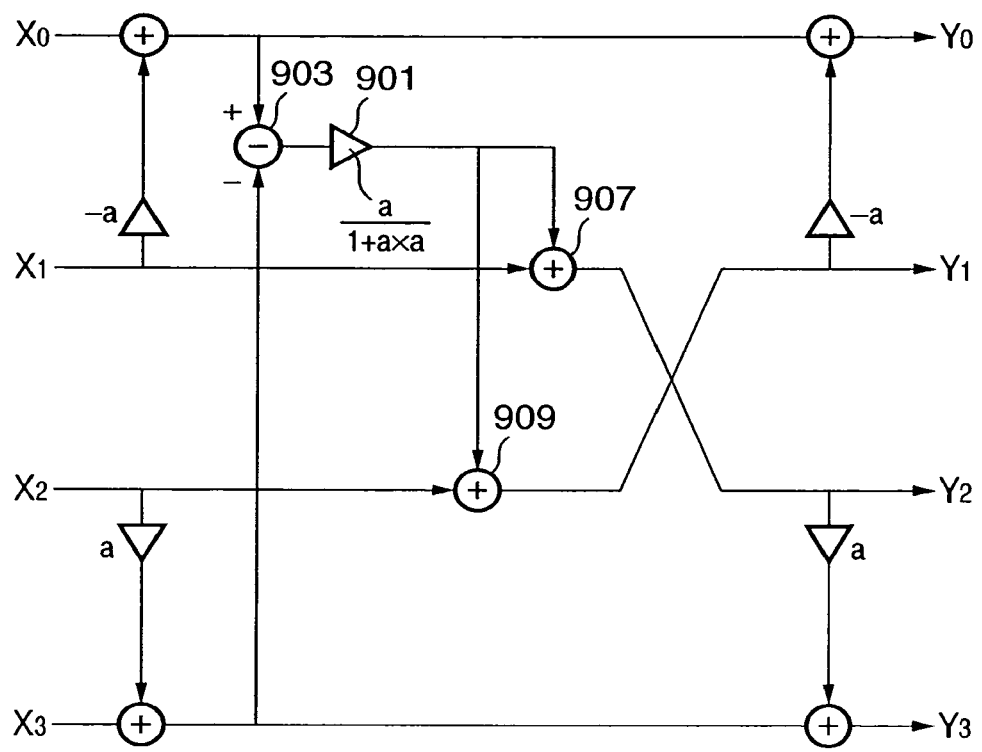
FIG. 11 is a block diagram showing a structure to realize a high-speed linear 4-point orthogonal transform where rounding processors are removed from the third modification to the second embodiment.
Figure 18:
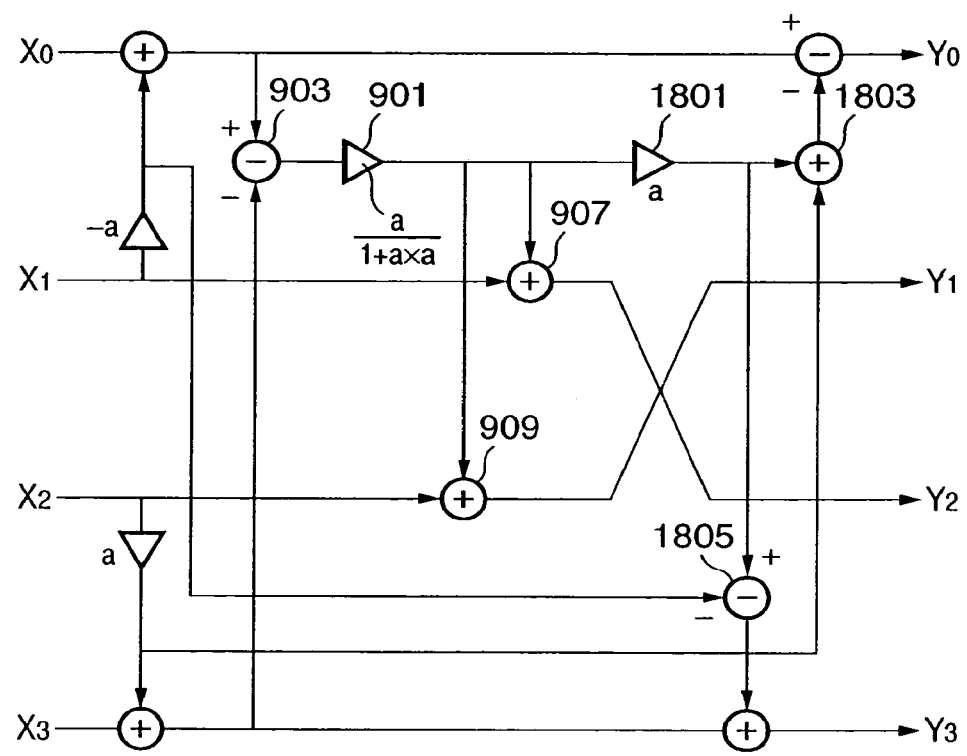
FIG. 18 is a block diagram showing a structure to realize a linear 4-point orthogonal transform where the structure in FIG. 11 in which the rounding processors are removed from the third modification to the second embodiment is modified.

As the structure in FIG. 11 is similar to that in FIG. 10, the structure in FIG. 11 is included in this embodiment, however, the structure in FIG. 11 is advantageous as a high-speed liner orthogonal transform operation method having higher versatility than a lossless transform. Further, the structure in FIG. 11 can be modified as shown in FIG. 18, in which the number of multiplication processings in the ladder operations can be finally reduced to four. In FIG. 18, a lossless transform can also be realized by carefully introducing rounding processing. Note that in FIG. 18, numeral 1801 denotes a multiplier for multiplication by a coefficient a; numeral 1803 denotes an adder; and numeral 1805 denotes a subtracter.

Fourth Modification to Second Embodiment

Further, in FIG. 7, when a=TAN(θ)=1 holds, the 4-point orthogonal transform becomes a lossless 4-point Hadamard transform.

Generally, upon Hadamard transform, input data are rearranged (for example, a butterfly operation is performed between X0 and X3), however, the input data rearrangement is not performed but the output data are rearranged.

Figure 12:
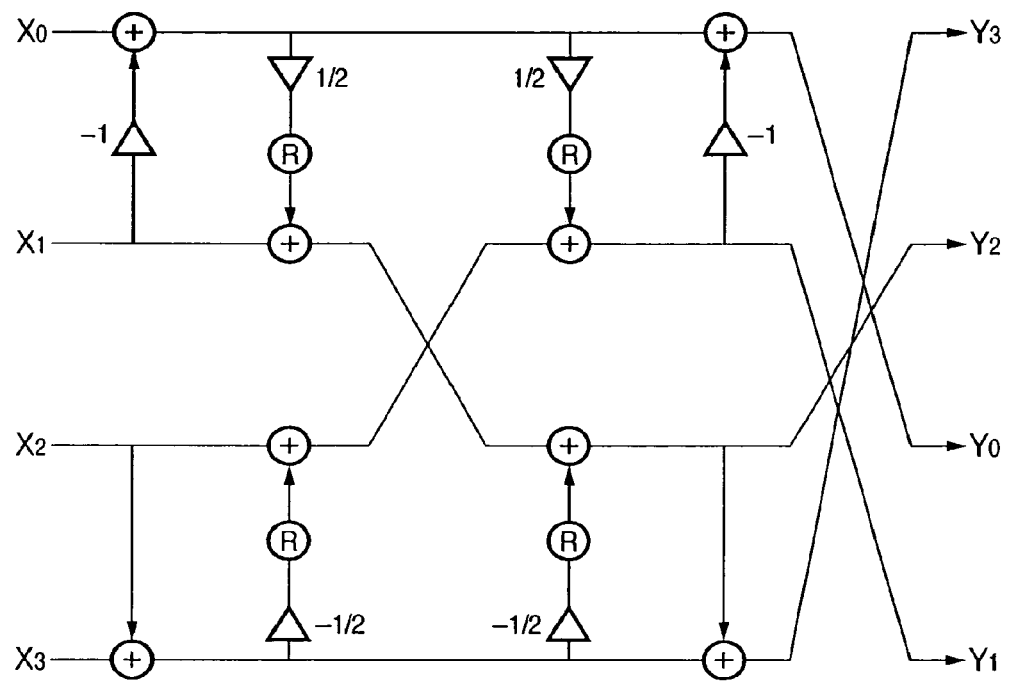
FIG. 12 is a block diagram showing the lossless 4-point orthogonal transform according to a fourth modification to the second embodiment.

In the structure in FIG. 7, on the assumption that a=1 holds, the output rearrangement is performed as shown in FIG. 12.

FIG. 12 is a block diagram showing the lossless 4-point orthogonal transform according to a fourth modification to the second embodiment.

In a case where the multiplication coefficient in the ladder operation is an integer value, as the value below decimal point is "0", the rounding processing is not necessary, therefore the number of rounding processings is reduced. Further, as the multiplication coefficient (½) can be realized only by bit shift, the multiplier can be omitted.

The structure in FIG. 12 can be modified as in the case of the second modification (FIG. 9) and the third modification (FIG. 10). The structure of the modification as in the case of FIG. 10 having a significant meaning will be described with reference to FIG. 13.

FIG. 13 is a block diagram showing the lossless 4-point orthogonal transform in a case where a=1 holds in FIG. 10.

In the structure in FIG. 13, the lossless 4-point orthogonal transform can be realized with a bit shift (½) 1300, one rounding processing 1301 and seven addition/subtraction processings 1302 to 1308. The amount of operation is smaller than that when the transform is realized using butterfly operation as a high-speed operation in a linear Hadamard transform.

On the other hand, the following document 2 shows the structure of lossless 4-point Hadamard transform. In the document 2, to realize the lossless transform, a 4-point Hadamard matrix is divided into triangular matrices and replaced with ladder operations. In this complicated structure, the number of addition processings is larger than that in the structure in FIG. 12 obtained from the fourth modification to the second embodiment by one, that is, eight addition/subtraction processings are required. In use of the second embodiment, a particular solution of generalized lossless 4-point orthogonal transform can be obtained, and further, the number of addition/subtraction processors can be minimized by slight modification.

(Document 2) Shinji Fukuma, Kohichi Ohyama, Masahiro Iwahashi and Nori Kanbayashi, "Lossless 8-Point High-Speed Discrete Cosine Transform Utilizing Lossless Hadamard Transform", Singaku Gihou, IE99-65, pp. 37-44, October 1999

Application of Second Embodiment

Figure 1:
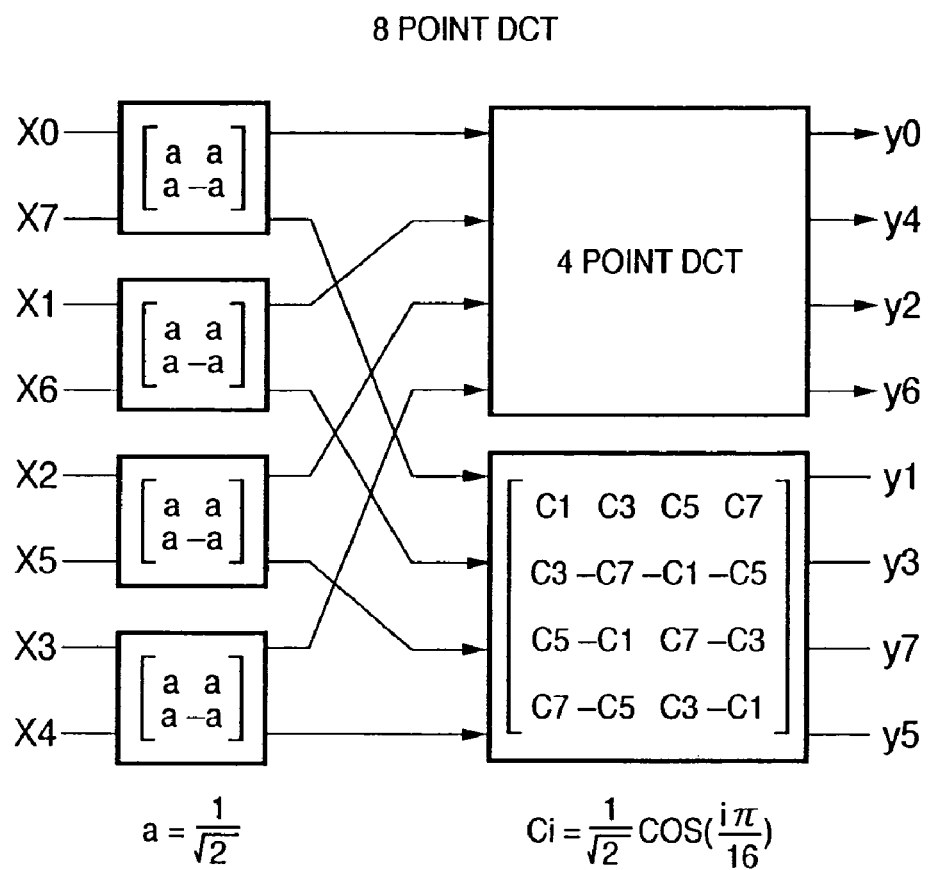
FIG. 1 is a block diagram showing a general 8-point DCT operation method.
Figure 2:
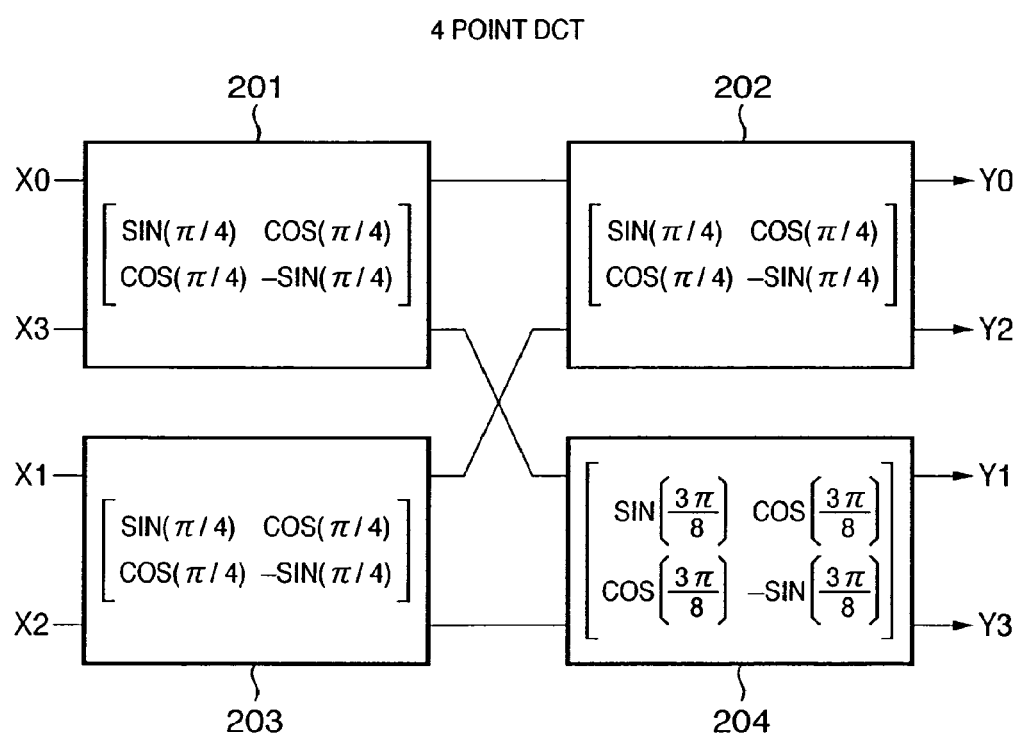
FIG. 2 is a block diagram showing a general 4-point DCT operation method.

In the 4-point DCT operation shown in FIG. 2, rotation processing at (3π/8) is required. The rotational angle (3π/8) may be changed to rotation processing at (π/8) by interchange of transform space axes or sign inversion, however, in this example, the rotation processing at (3π/8) without any change is performed. In a case where the 4-point DCT is changed to two-dimensional operation and the order of a part of horizontal processing and the order of a part of vertical processing are interchanged, the following operation locally appears as intermediate processing.

$$\begin{bmatrix} \cos\frac{3\pi}{8} & \sin\frac{3\pi}{8} \\ -\sin\frac{3\pi}{8} & \cos\frac{3\pi}{8} \end{bmatrix} \begin{bmatrix} X_{11} & X_{12} \\ X_{21} & X_{22} \end{bmatrix} \begin{bmatrix} \cos\frac{3\pi}{8} & -\sin\frac{3\pi}{8} \\ \sin\frac{3\pi}{8} & \cos\frac{3\pi}{8} \end{bmatrix}$$ [Expression 4]

In the expression 4, components $X_{11}$, $X_{12}$, $X_{21}$, and $X_{22}$ are data in the middle of operation. If the left side transform matrix is subjected to the horizontal processing, the right side transform matrix corresponds to the vertical processing. Both transform matrices express rotation processing at (3π/8). In a linear transform, any of the transform processings can be performed first (at this time, as rounding processing for lossless transform is not inserted, the transform is not a lossless transform but a linear transform), however, in this example, the left transform matrix is first subjected to processing.

More specifically, the rotation processing at (3π/8) is performed on two pairs of data, ($X_{11}$, $X_{21}$) and ($X_{12}$, $X_{22}$), then the results of transform is transposed, for example, a part of the data are interchanged and the rotation processing at (3π/8) is performed again. This processing is realized as a lossless transform in the structures in FIGS. 5 to 9 where θ=3π/8 holds.

Third Embodiment

In this embodiment, orthogonal transform processing capable of selection between the 2-point orthogonal transform and the 4-point orthogonal transform is provided by using the structures in FIGS. 5A and 5B described in the first embodiment, and a data selector. The structure for the processing is as shown in FIG. 14.

Figure 14:
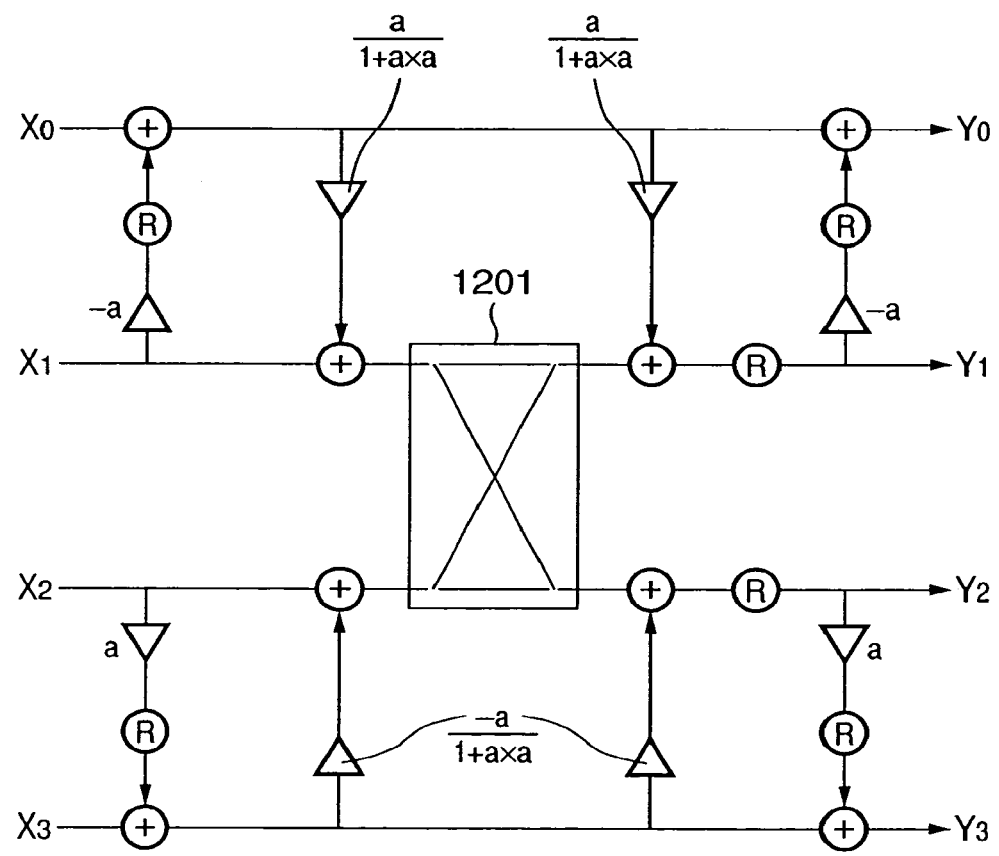
FIG. 14 is a block diagram showing the lossless 4-point orthogonal transform according to a third embodiment of the present invention.

FIG. 14 is a block diagram showing the lossless 4-point orthogonal transform according to a third embodiment of the present invention.

In this structure, a new constituent element is a data selector 1201. If the data flow is changed by the data selector 1201, the lossless 4-point orthogonal transform is realized, whereas if the data flow is not changed by the data selector 1201, the two lossless 2-point orthogonal transforms are realized.

Modification to Third Embodiment

In the above-described second embodiment, the structure in FIG. 7 can be simplified to the structure in FIG. 10, however, in the third embodiment, as two types of functions are realized, such simplification cannot be attained. However, the structure can be modified to a structure as shown in FIG. 15.

Figure 15:
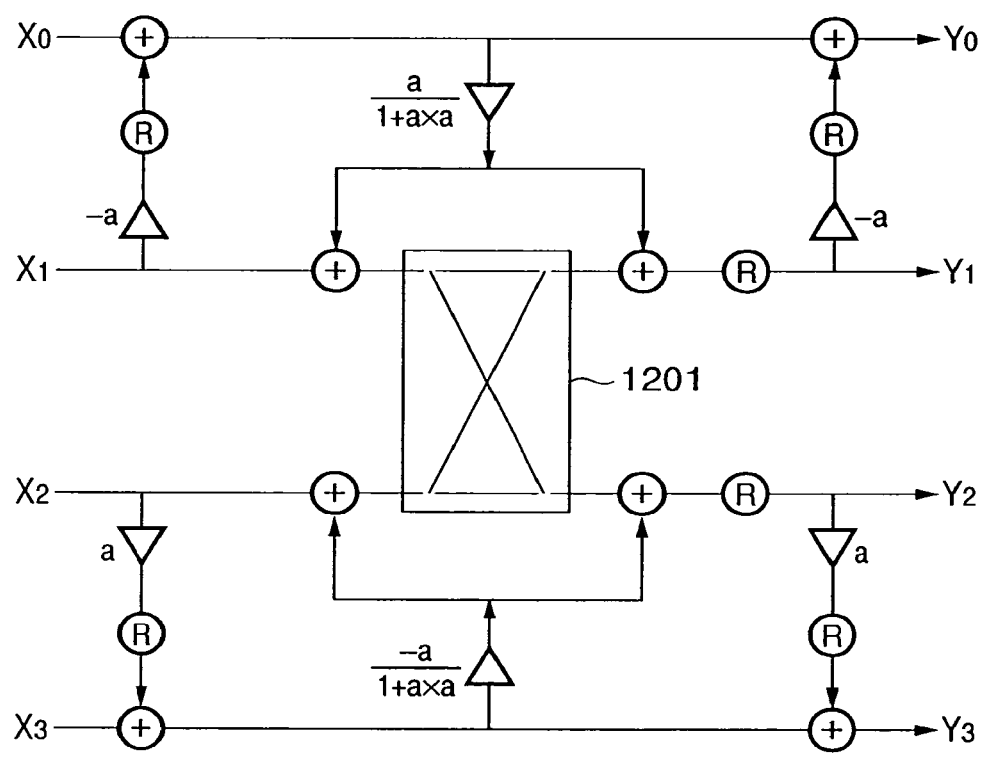
FIG. 15 is a block diagram showing the lossless 4-point orthogonal transform according to a modification to the third embodiment.

FIG. 15 is a block diagram showing the lossless 4-point orthogonal transform according to a modification to the third embodiment.

In FIG. 15, the multipliers for multiplication by the coefficient $\{a/(1+a^2)\}$ and the multipliers for multiplication by the coefficient $\{-a/(1+a^2)\}$ in FIG. 14 are respectively integrated, thereby the number of multiplications is reduced to six, the same as the number of multiplications by two lossless 2-point orthogonal transforms.

Fourth Embodiment

In this embodiment, image data or the like is encoded by quantizing and Huffman coding the DCT coefficients, obtained by the lossless two-dimensional DCT transform to which the above-described ladder operation is applied.

Generally, an 8×8 block sized two-dimensional DCT in JPEG compression or the like is used, however, in this example, a 4×4 lossless two-dimensional DCT transform is used. The 4×4 two-dimensional DCT can be expanded to an 8×8 two-dimensional DCT by a well-known technique.

The 4-point DCT transform matrix Mdct is expressed as follows.

$$Mdct = \frac{1}{2}\begin{bmatrix} 1 & 1 & 1 & 1 \\ C1 & C3 & -C3 & -C1 \\ 1 & -1 & -1 & 1 \\ C3 & -C1 & C1 & -C3 \end{bmatrix} = \begin{bmatrix} 1 & 0 & 0 & 0 \\ 0 & \alpha & 0 & \beta \\ 0 & 0 & 1 & 0 \\ 0 & -\beta & 0 & \alpha \end{bmatrix} \frac{1}{2}\begin{bmatrix} 1 & 1 & 1 & 1 \\ 1 & 1 & -1 & -1 \\ 1 & -1 & -1 & 1 \\ 1 & -1 & 1 & -1 \end{bmatrix}$$ [Expression 5]

$$Ci = \sqrt{2}\cos\frac{i\pi}{8}, \alpha = \cos\frac{\pi}{8}, \beta = \sin\frac{\pi}{8}$$

Assuming that the original 4×4 data are represented as $d_{00}$, $d_{01}$, $d_{02}$, ..., $d_{32}$ and $d_{33}$, the 4×4 two-dimensional DCT is expressed as follows.

$$M_{dct}\begin{bmatrix} d_{00} & d_{01} & d_{02} & d_{03} \\ d_{10} & d_{11} & d_{12} & d_{13} \\ d_{20} & d_{21} & d_{22} & d_{23} \\ d_{30} & d_{31} & d_{32} & d_{33} \end{bmatrix}M_{dct}^T = \begin{bmatrix} 1 & 0 & 0 & 0 \\ 0 & \alpha & 0 & \beta \\ 0 & 0 & 1 & 0 \\ 0 & -\beta & 0 & \alpha \end{bmatrix}$$ [Expression 6]

$$\begin{bmatrix} x_{00} & x_{01} & x_{02} & x_{03} \\ x_{10} & x_{11} & x_{12} & x_{13} \\ x_{20} & x_{21} & x_{22} & x_{23} \\ x_{30} & x_{31} & x_{32} & x_{33} \end{bmatrix}\begin{bmatrix} 1 & 0 & 0 & 0 \\ 0 & \alpha & 0 & -\beta \\ 0 & 0 & 1 & 0 \\ 0 & \beta & 0 & \alpha \end{bmatrix}$$

In the above expression, the components $x_{00}x_{01}$, $x_{02}$, ..., $x_{32}$ and $X_{33}$ indicate data obtained by a two-dimensional Hadamard transform on original data.

The horizontal lossless rotational transform and the vertical lossless rotational transform performed on the data resulted from the lossless two-dimensional Hadamard transform equals a lossless two-dimensional DCT transform. The horizontal lossless rotational transform is performed on four pairs of data, $x_{01}$ and $x_{03}$, $x_{11}$ and $x_{13}$, $x_{21}$ and $x_{23}$, and $x_{31}$ and $x_{33}$, while the vertical lossless rotational transform is performed on the four pairs of data, $x_{10}$ and $x_{30}$, $x_{11}$ and $X_{31}$, $x_{12}$ and $x_{32}$, and $x_{13}$ and $X_{33}$, which are results from horizontal transform.

Figure 16:
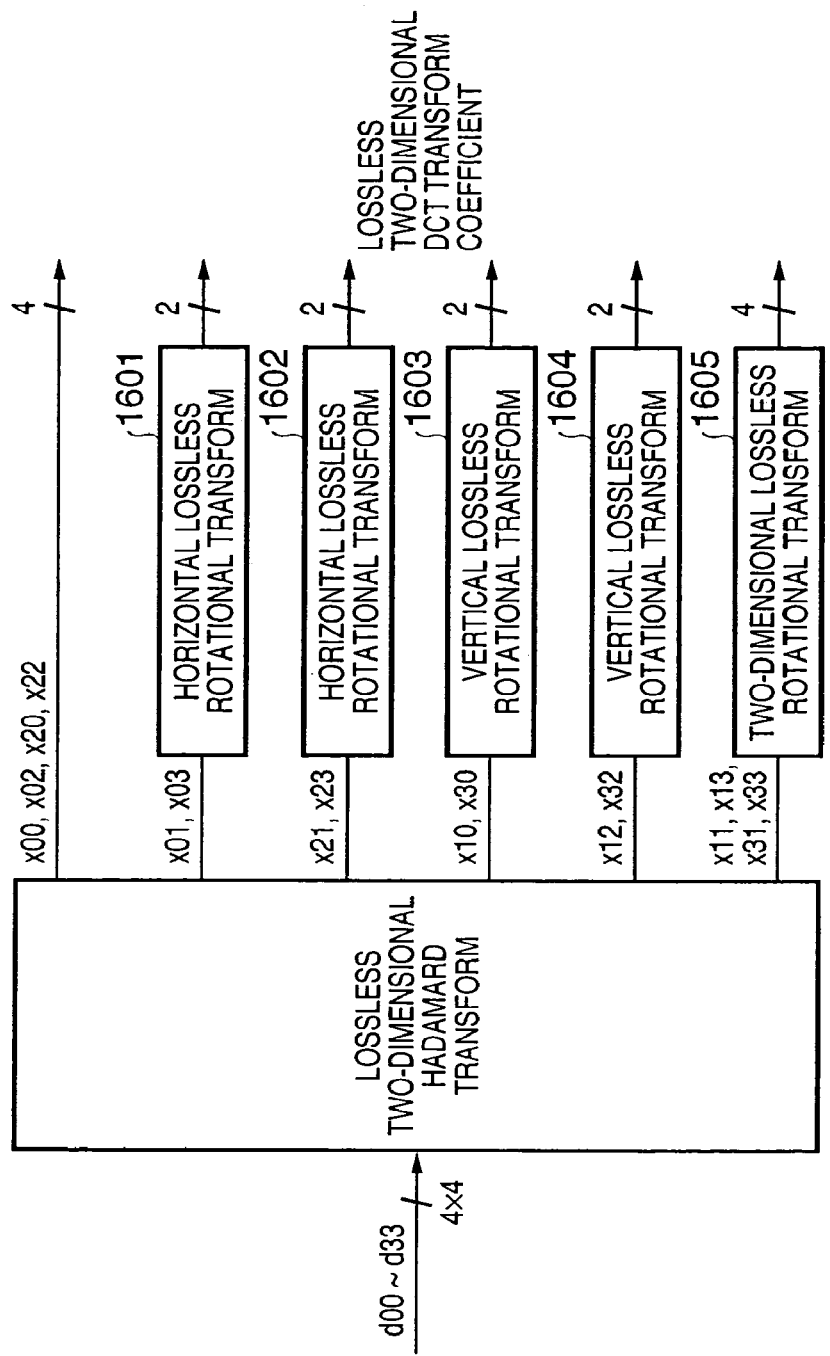
FIG. 16 is a block diagram showing a 4×4 lossless two-dimensional DCT transform according to a fourth embodiment of the present invention.

FIG. 16 is a block diagram showing a 4×4 lossless two-dimensional DCT transform according to the fourth embodiment of the present invention.

In FIG. 16, lossless rotational transforms 1601 and 1602 only in the horizontal direction are performed on two pairs of data, $x_{01}$ and $x_{03}$, and $x_{21}$ and $x_{23}$, and lossless rotational transforms 1603 and 1604 only in the vertical direction are performed on two pairs of data, $x_{10}$ and $x_{30}$, and $x_{12}$ and $x_{32}$, and further, a lossless two-dimensional rotational transform 1605 in the horizontal and vertical directions is performed on two pairs of data, $x_{11}$ and $x_{13}$, and $x_{31}$ and $X_{33}$.

The horizontal or vertical lossless rotational transforms 1601 to 1604 are realized with a conventional three step ladder operation as shown in FIG. 3, and the lossless two-dimensional rotational transform 1605 is realized with a ladder operation of the structure as shown in FIG. 9 or FIG. 10. Regarding the other data $x_{00}$ and $x_{02}$, and $x_{20}$ and $x_{22}$ not subjected to any rotational transform, the lossless two-dimensional Hadamard transform coefficients are used as lossless two-dimensional DCT transform coefficients.

Figure 17:
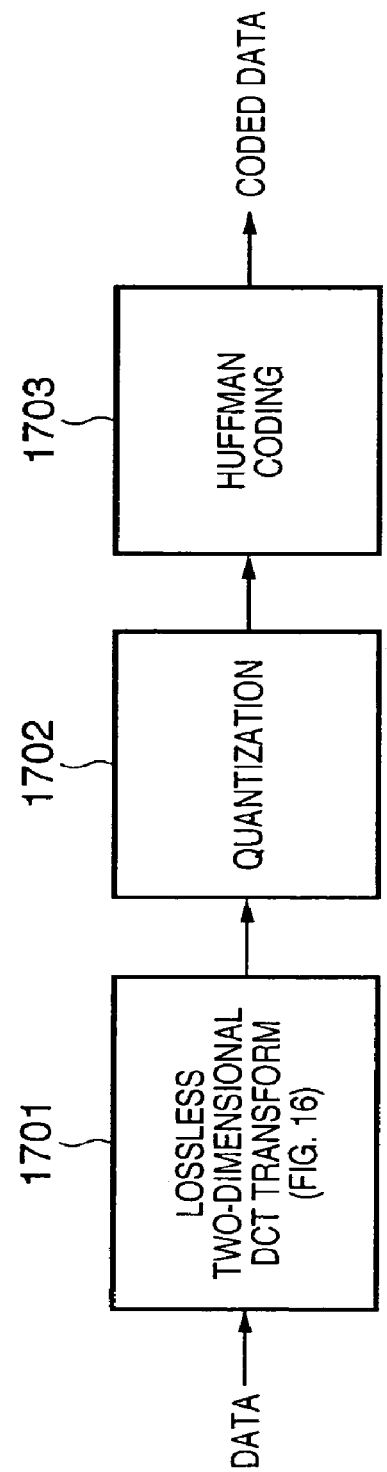
FIG. 17 is a block diagram showing coding processing capable of lossless coding according to the fourth embodiment.

FIG. 17 is a block diagram showing coding processing capable of lossless coding according to the fourth embodiment.

First, a lossless two-dimensional DCT transform processing 1701 as shown in FIG. 16 is performed, then quantization processing 1702 and Huffman coding processing 1703 are performed, thereby coded data can be obtained. If all the values of quantization steps are "1", lossless coding can be performed. That is, in a case where a lossless two-dimensional inverse DCT transform, inverse of the lossless two-dimensional DCT transform 1605 in FIG. 16, is performed in decoding processing, the original data can be completely decoded if all the values of quantization steps are "1".

Accordingly, by setting the quantization steps upon coding processing, the quality of compressed/decompressed image can be continuously controlled by lossless coding to nonlossless (lossy) high-efficiency compression with degradation.

Other Embodiment

Further, the object of the present invention can also be achieved by providing a storage medium holding software program code for performing the aforesaid processes to a system or an apparatus, reading the program code with a computer (e.g., CPU, MPU) of the system or apparatus from the storage medium, then executing the program. In this case, the program code read from the storage medium realizes the functions according to the embodiments, and the storage medium holding the program code constitutes the invention. Further, the storage medium, such as a floppy disk (registered trademark), a hard disk, an optical disk, a magneto-optical disk, a CD-ROM, a CD-R, a DVD, a magnetic tape, a non-volatile type memory card, and ROM can be used for providing the program code.

Furthermore, besides aforesaid functions according to the above embodiments are realized by executing the program code which is read by a computer, the present invention includes a case where an OS (operating system) or the like working on the computer performs a part or entire actual processing in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

As described above, the present invention provides lossless 4-point orthogonal transform processing and apparatus capable of transformation with a reduced amount of operation and with high transform accuracy. More particularly, a lossless 4-point orthogonal transform can be realized as five multiplications and five rounding processings with an optimized structure.

Further, the number of multiplications can be reduced to ⅓ of a conventional case where twelve multiplications and twelve rounding processings or fifteen multiplications and five rounding processings are required, even with approximately the same transform accuracy (with the same number of rounding processings).

The present invention is not limited to the above embodiments and various changes and modifications can be made within the spirit and scope of the present invention. Therefore, to appraise the public of the scope of the present invention, the following claims are made.

What is claimed is:

1. A data transform apparatus for converting four items of input data X0, X1, X2 and X3 into four items of data in a frequency space, wherein the input data X0, X1, X2 and X3 are integers, the apparatus comprising:
    a first multiplier configured to multiply the input data X1 by a first coefficient;
    a second multiplier configured to multiply the input data X2 by a second coefficient;
    a first rounding processor configured to perform rounding processing on an output of said first multiplier;
    a second rounding processor configured to perform rounding processing on an output of said second multiplier;
    a first calculator configured to add an output of said first rounding processor to the input data X0;
    a second calculator configured to add an output of said second rounding processor to the input data X3;
    a third rounding processor configured to obtain difference data between an output of said first calculator and an output of said second calculator, to multiply the difference data by a third coefficient and to perform rounding processing on the result of multiplication of the difference data by the third coefficient;
    a third calculator configured to add an output of said third rounding processor to the input data X1;
    a fourth calculator configured to add an output of said third rounding processor to the input data X2;
    a fourth multiplier configured to multiply an output of said third calculator by the second coefficient;
    a fifth multiplier configured to multiply an output of said fourth calculator by the first coefficient;
    a fourth rounding processor configured to perform rounding processing on an output of said fourth multiplier;
    a fifth rounding processor configured to perform rounding processing on an output of said fifth multiplier;
    a fifth calculator configured to add an output of said fourth rounding processor to an output of said second calculator; and
    a sixth calculator configured to add an output of said fifth rounding processor to an output of said first calculator,
    wherein the outputs of said third, fourth, fifth and sixth calculators are output as the four items of data in the frequency space.

2. A data transform method of converting four items of input data X0, X1, X2 and X3 into four items of data in a frequency space, wherein the input data X0, X1, X2 and X3 are integers, the method comprising:
    a first multiplying step of multiplying the input data X1 by a first coefficient;
    a second multiplying step of multiplying the input data X2 by a second coefficient;
    a first rounding step of performing rounding processing on an output obtained in said first multiplying step;
    a second rounding step of performing rounding processing on an output obtained in said second multiplying step;
    a first calculating step of adding an output obtained in said first rounding step to the input data X0;
    a second calculating step of adding an output obtained in said second rounding step to the input data X3;
    a third rounding step of obtaining difference data between an output obtained in said first calculating step and an output obtained in said second calculating step, multiplying the difference data by a third coefficient and performing rounding processing on the result of multiplication of the difference data by the third coefficient;
    a third calculating step of adding an output obtained in said third rounding step to the input data X1;
    a fourth calculating step of adding an output obtained in said third rounding step to the input data X2;

a fourth multiplying step of multiplying an output obtained in said third calculating step by the second coefficient;

a fifth multiplying step of multiplying an output obtained in said fourth calculating step by the first coefficient;

a fourth rounding step of performing rounding processing on an output obtained in said fourth multiplying step;

a fifth rounding step of performing rounding processing on an output obtained in said fifth multiplying step;

a fifth calculating step of adding an output obtained in said fourth rounding step to an output obtained in said second calculating step; and a sixth calculating step of adding an output obtained in said fifth rounding step to an output obtained in said first calculating step, wherein the outputs obtained in said third, fourth, fifth and sixth calculating steps are output as the four items of data in the frequency space.

3. A data transform apparatus for converting four items of input data $X0$, $X1$, $X2$ and $X3$ into four items of data in a frequency space, wherein the input data $X0$, $X1$, $X2$ and $X3$ are integers, the apparatus comprising:

a first calculator configured to add the input data $X3$ to the input data $X2$;

a second calculator configured to subtract the input data $X1$ from the input data $X0$;

a rounding processor configured to obtain difference data between an output of said first calculator and an output of said second calculator, to multiply the difference data by a coefficient and to perform rounding processing on the result of multiplication of the difference data by the coefficient;

a third calculator configured to add the input data $X1$ to an output of said rounding processor;

a fourth calculator configured to add the input data $X2$ to the output of said rounding processor;

a fifth calculator configured to subtract an output of said fourth calculator from an output of said second calculator; and a sixth calculator configured to add an output of said first calculator to an output of said third calculator, wherein the outputs of said third, fourth, fifth and sixth calculators are output as the four items of data in a frequency space.

4. An apparatus according to claim 3, wherein said rounding processor converts the result of multiplication into an integer by counting fractions over ½ as one and disregarding the rest, or counting fractions as one, or omission of fractions.

* * * * *